United States Patent [19]

Hager

[11] Patent Number: 4,789,099

[45] Date of Patent: Dec. 6, 1988

[54] METHOD AND PORTABLE APPARATUS FOR CHEMICAL SPRAYING OF UNWANTED BIRD ROOSTS

[75] Inventor: G. Brent Hager, Goodletsville, Tenn.

[73] Assignee: Metropolitan Government of Nashville and Davidson County, Nashville, Tenn.

[21] Appl. No.: 9,243

[22] Filed: Jan. 30, 1987

[51] Int. Cl.[4] .............................................. B05B 3/16
[52] U.S. Cl. ....................................... 239/10; 239/281; 239/172; 43/124; 248/80
[58] Field of Search ............... 239/723, 743, 749, 280, 239/280.5, 281, 273, 542, 173, 10, 172; 248/80, 81, 83, 165, 166, 370, 163.1, 163.2, 188.1, 188.2; 43/126, 125, 124; 52/101

[56] References Cited

U.S. PATENT DOCUMENTS

| | | | |
|---|---|---|---|
| 1,959,886 | 5/1934 | Wadsworth | 239/280.5 |
| 2,064,278 | 12/1936 | Tappe | 239/587 |
| 2,241,857 | 5/1941 | Hisaw | 239/159 |
| 2,242,840 | 5/1941 | Warden | 248/83 |
| 2,694,600 | 11/1954 | Richey | 239/723 |
| 4,165,834 | 8/1979 | Pitchon et al. | 239/10 |
| 4,512,516 | 4/1985 | Ballu | 239/587 |
| 4,570,854 | 2/1986 | Wernhart | 239/280 |

FOREIGN PATENT DOCUMENTS 616686  1/1949  United Kingdom ............... 248/166

OTHER PUBLICATIONS

Alfred E. Lewis, District Starlings to Get 'Roost No More' Treatment on Inaugural Parade Route, Washington Post, Nov. 28, 1956.

Primary Examiner—Douglas C. Butler
Assistant Examiner—C. Trainor
Attorney, Agent, or Firm—Mark J. Patterson

[57] ABSTRACT

A method for chemical spray treatment of unwanted bird roosts whereby a mixture of water and chemical wetting agents are pumped to the spray location under high pressure through flexible water hose. A single vertical riser pipe is assembled and hinge mounted to a portable base support which is adjusted to match the ground terrain. A water powered rotating sprinkler is attached to the top of the pipe and adjusted to the desired spray arc and radius. The pipe and sprinkler are hoisted to the vertical position, secured, and the roost is sprayed until the birds are soaked. The portable base support is assembled with hinge pins and has adjustments on each leg to allow it to conform to the ground terrain.

3 Claims, 8 Drawing Sheets

METHOD AND PORTABLE APPARATUS FOR CHEMICAL SPRAYING OF UNWANTED BIRD ROOSTS

BACKGROUND OF THE INVENTION

The present invention relates to a method and portable apparatus to be used for the spray application of chemicals on trees and other elevated vegetation, for the eradication of birds or other animals located thereon.

The removal of unwanted bird roosts from tree stands is becoming a more frequently encountered problem for land owners and governmental authorities. Large stagnant populations of birds such as starlings or blackbirds pose many hazards to property, vegetation, community health, and even airport navigation. Many methods have been attempted to remove such unwanted bird roosts, including noise generation, visual fright stimulation, removal of vegetation, and chemical spraying. By far the most successful method has been the spray application of a chemical wetting agent, mixed with water, directly on the birds. This reduces the surface tension of feather oils, allowing water to penetrate the skin, eventually chilling and killing the birds.

Unfortunately, previously known systems of chemical spraying of bird roosts, such as by helicopter or conventional irrigation-type systems, have been unsatisfactory. Usually, some amount of rainfall is needed within a 24 hour period prior to spraying so that the bird feathers will be soaked. Helicopters cannot carry enough water and chemical to accomplish this. Also, helicopter spraying cannot provide a regular spray pattern, which results in an inconsistent and incomplete bird kill. Because most bird roosts are at least eight to ten acres, helicopter spraying is expensive.

Ground-based sprinkler systems using conventional agricultural irrigation components have been used with some success. The U.S. Fish and Wildlife Service configured such a system in 1980. However, such systems are massive, using an extensive series of lateral pipes with twenty vertical risers and sprinkler heads per acre. Moreover, substantial alteration of the bird roost itself, e.g., removal of trees and vegetative ground cover, is usually necessary just to set the system up. Because of the use of multiple sprinkler heads mounted directly in the roost, the noise from the system scares off many birds before they can be effectively treated. Experience has also shown that at least four-hundred man hours are required just to set up such a system to cover only two acres. These conventional irrigation-type spray systems are limited in coverage because the components have limited spray radius and spray elevation. This is particularly true in areas of varying terrain, for which conventional irrigation-type spraying systems are unsuited. Finally, the typical cost of present systems, approximately $12,000.00, is too high to allow routine use by individuals or small government agencies.

What is needed, then, is a system for spray treating unwanted bird roosts that is low-cost, easy to set up, non-damaging to the environment, and that can cover a large area of varying terrain.

SUMMARY OF THE INVENTION

The present invention relates to a method and portable apparatus for spray chemical treatment of unwanted bird roosts. A pump capable of delivering 130 to 150 psi is connected to a water source with its output connected to a flexible fire-type hose fitted with fire hose-type male-female connectors. These are commonly referred to in the fire hose industry, and known by the trademark as "STORZ" connectors. This greatly facilitates set-up, particularly when compared to the rigid pipe and pipe connectors used in conventional spray irrigation systems. An appropriate number of flexible hose sections is chosen to correspond to the distance from the water supply to the spray location.

A vertical riser pipe, either truck or ground-mounted, with guy wires, is erected at a point in or adjacent to the bird roost to be sprayed. The vertical riser is made of sections of rigid pipe bolted together using conventional four bolt-type flange and gasket assemblies. The number of sections used is determined by the elevation of the bird roost and the spray radius needed. Field tests have shown that with a 33-foot vertical riser pipe, spray elevations of 125 feet are attainable, compared with 50-feet spray elevations from the multiple 10-foot risers used in conventional systems. Depending on the height selected for the riser, either one or two sets of guy wires are used.

A turbine driven sweep sprinkler with adjustable spray arc, such as the G.I.C. P-1200, available from General Irrigation Company, Carthage, Mo., is mounted at the top of the riser with a standard four bolt flange and gasket assembly. These irrigation-type gun mount sprinklers have a separate water line for turbine driving the geared arc rotation system. The adjustment of the spray arc up to 360 degrees allows the sprinkler to be located at the corner of a roost if a more central location is less desirable due to terrain, tree location, or for noise considerations. Delivery of water pressure of 120 psi at the base of the riser pipe has resulted in a spray radius of 300 feet versus 20 feet for each riser in a conventional system. Consequently, up to seven acres of bird roost can be sprayed at one time, over three times the coverage of conventional systems. The base of the vertical riser is swivel hinge mounted for ease in raising and lowering with minimal side-sway. The ground-mounted riser base assembly has three rigid legs extending horizontally and hinge mounted to the center of a lower base plate. A ground engaging pad is located at the outer end of each leg. Support arms extend upward from each end of the horizontal legs toward the upper base plate which secures the riser directly above the lower base plate. The outer lateral support arms are hinge mounted. The inner vertical support arms are mounted using adjustable swivel pins. These swivel mounting means allow the base to be quickly and easily adjusted to secure the base on uneven terrain.

The base of the vertical riser pipe is connected to the flexible supply hose using a conventional wide-angle 90 degree sweep connector which is welded at one end and fitted with a quick connect "STORZ" type connector at the other.

The truck mounted system is similar except that the vertical riser pipe is hinge mounted to the bed of a small truck. The riser is raised and lowered using a winched cable connected at the 90 degree elbow directly at the riser base. A total vertical rise of 43 feet is attainable.

The material cost of either system is approximately $1,500.00, exclusive of the pump.

An object of the present invention, then, is to provide a method and portable system for effective chemical spray treatment of bird roosts on trees that is inexpensive and easy to set up.

A further object of the present invention is to provide a system that can be placed without disturbing the environment.

Another object of the present invention is to provide a system that can cover a large area at one time.

A further object of the present invention is to provide a system that uses convenient and readily available flexible fire hose and fire-hose connectors.

Another object of the present invention is to provide a system that uses readily available turbine driven irrigation sprinklers with adjustable spray arc.

A further object of the present invention is to provide a system that can be easily adapted for use on uneven terrain.

DESCRIPTION OF THE PREFERRED EMBODIMENTS

Figure 1:
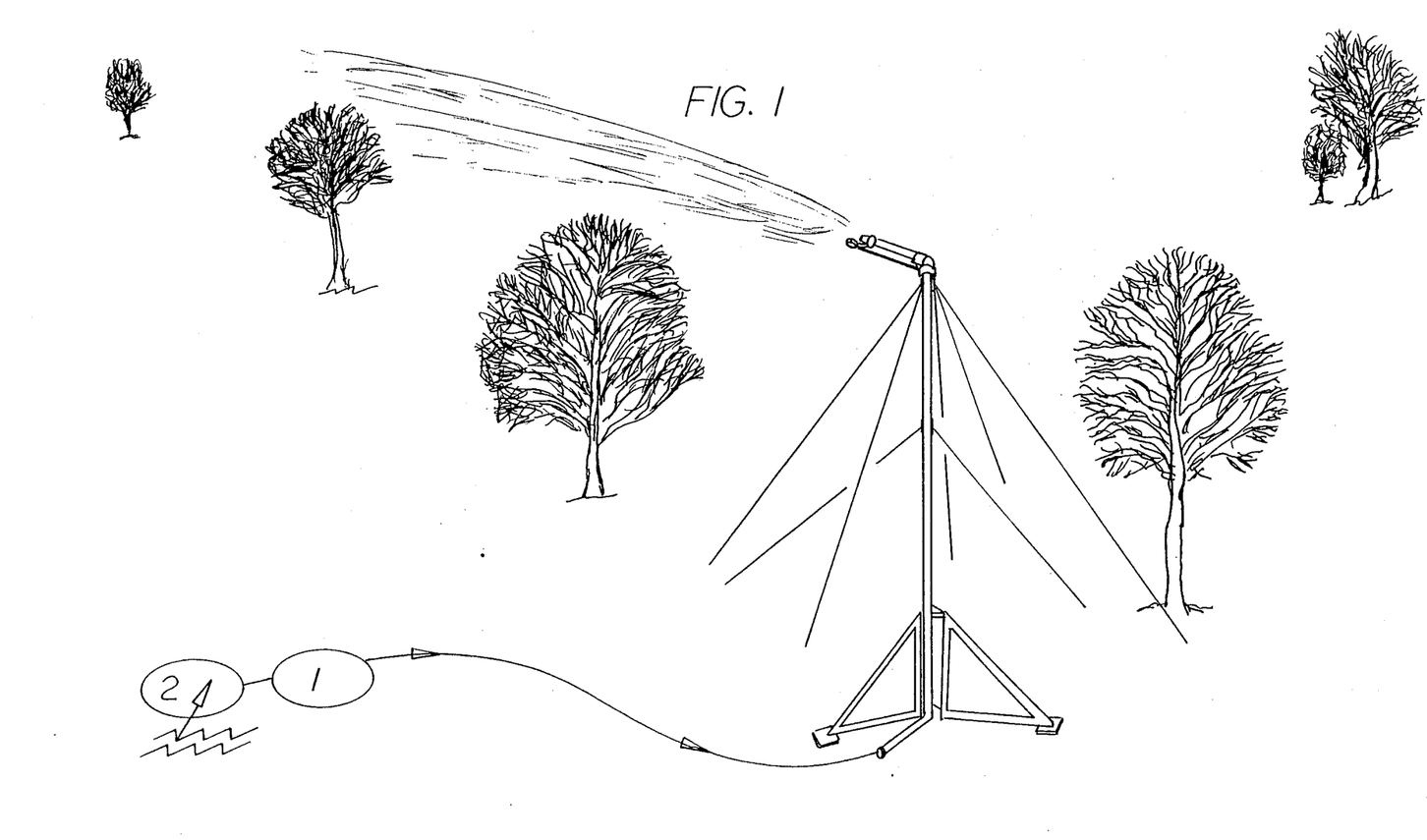
FIG. 1 is a schematic view of the entire portable ground-mounted spray system.
Figure 2:
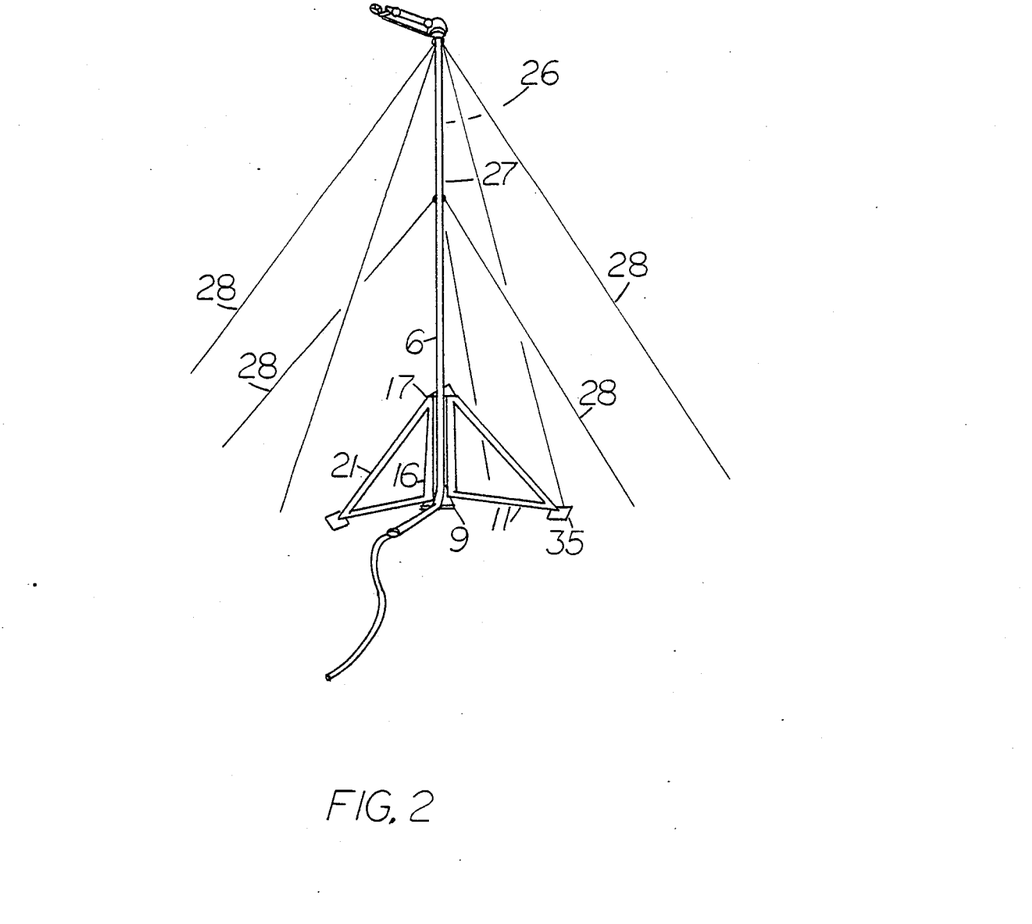
FIG. 2 is a view of the ground-mounted system as erected in the field with guy wires in place.

In the present invention, as shown on FIG. 1, a conventional high-pressure (130-150 psi) water pump 1 is connected to water supply 2 and flexible water hose 3, preferably standard five-inch fire hose using quick connect male-female fire hose connectors 4, commonly referred to and sold under the trademark "STORZ" connector. A chemical wetting agent is mixed with the water using three-port connector 36. An appropriate number of such fire hose sections and connectors are joined together and finally connected to pipe elbow 5 at the base of the vertical riser pipe 6. Riser pipe 6 is either ground mounted as shown on FIGS. 1 through 4 or truck mounted as shown on FIGS. 8 through 10.

Figure 10:
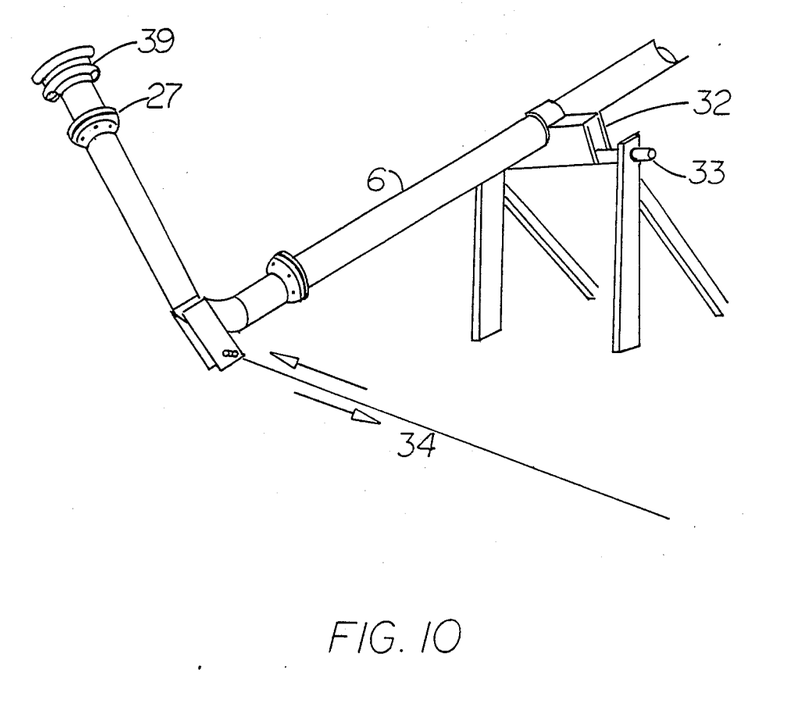
FIG. 10 is an enlarged view of the truck-mounted system during erection showing the lower elbow and winch point and upper hinge mount.

The "STORZ" type connector 39 at the end of elbow 5, as best seen on FIG. 10, is flange bolted to a section of four-inch pipe. The "STORZ" type connector is used on both the ground-mounted and truck-mounted systems. Hinge section 37 is then joined to base hinge section 7 with removable pin 8. This hinge and pin assembly minimizes side sway of riser pipe 6 during erection as shown on FIG. 4.

Lower base plate 9 is anchored to the ground using anchor pins 10. Extending radially from lower base plate 9 are three horizontal base legs 11 which are joined at plate 9 using pins 12 and 13. The use of pins 12 and 13 to connect legs 11 to plate 9 allows for ease of assembly and for flexibility of legs 11 on varying terrain.

Figure 6:
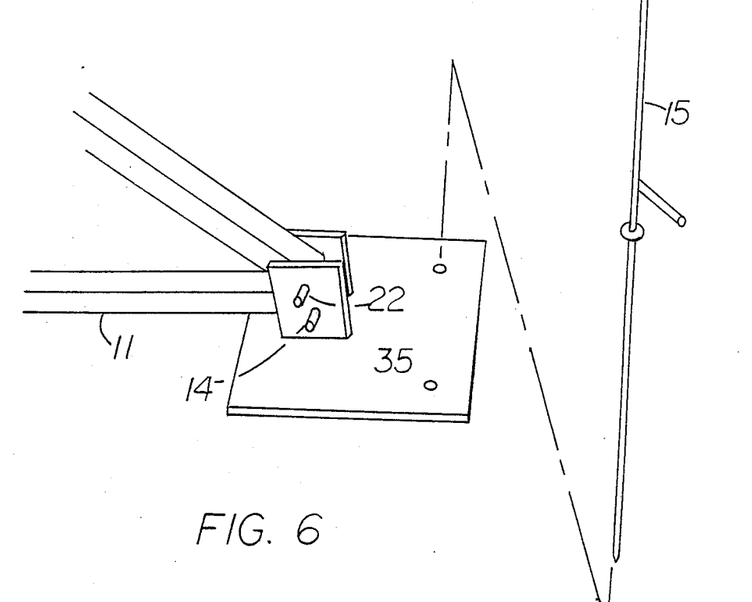
FIG. 6 is an enlarged view of the ground pads at the outer end of the horizontal base legs on the ground-mounted system.

As best seen in FIG. 6, ground pads 35 are mounted at the outer ends of legs 11 using pins 14. Ground anchors 15 secure ground pads 35.

Figure 3:
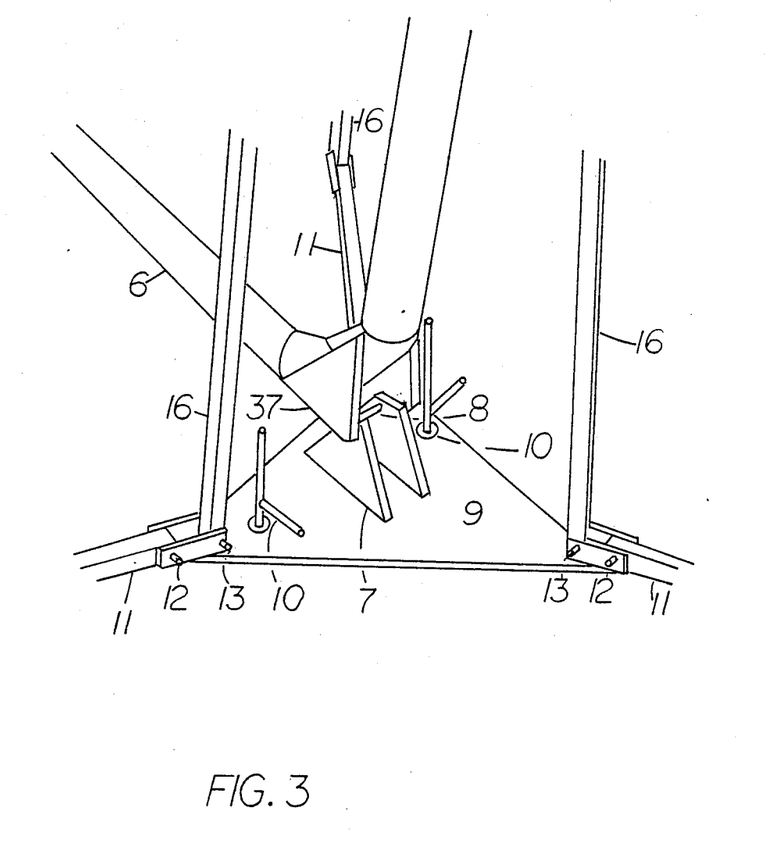
FIG. 3 is an enlarged view of the ground-mounted riser pipe base assembly, showing the hinge mount and riser pipe before erection.
Figure 4:
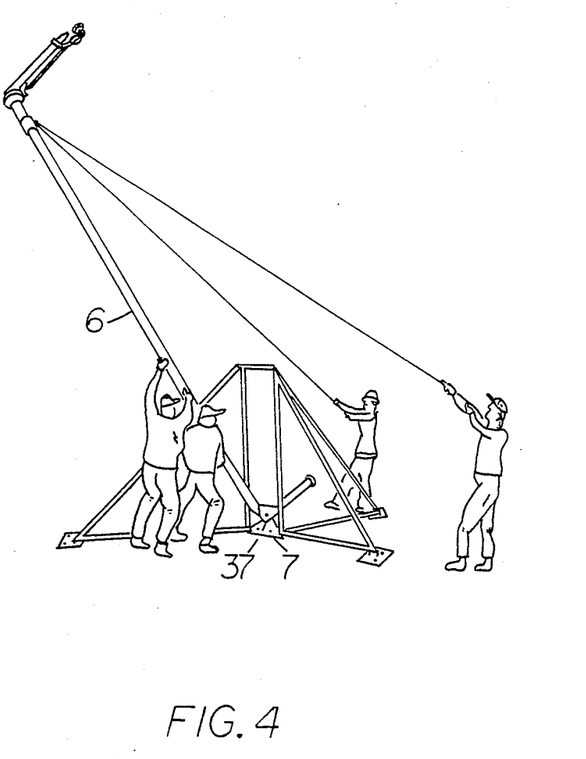
FIG. 4 is a view of the ground-mounted base and riser assembly during erection.
Figure 5:
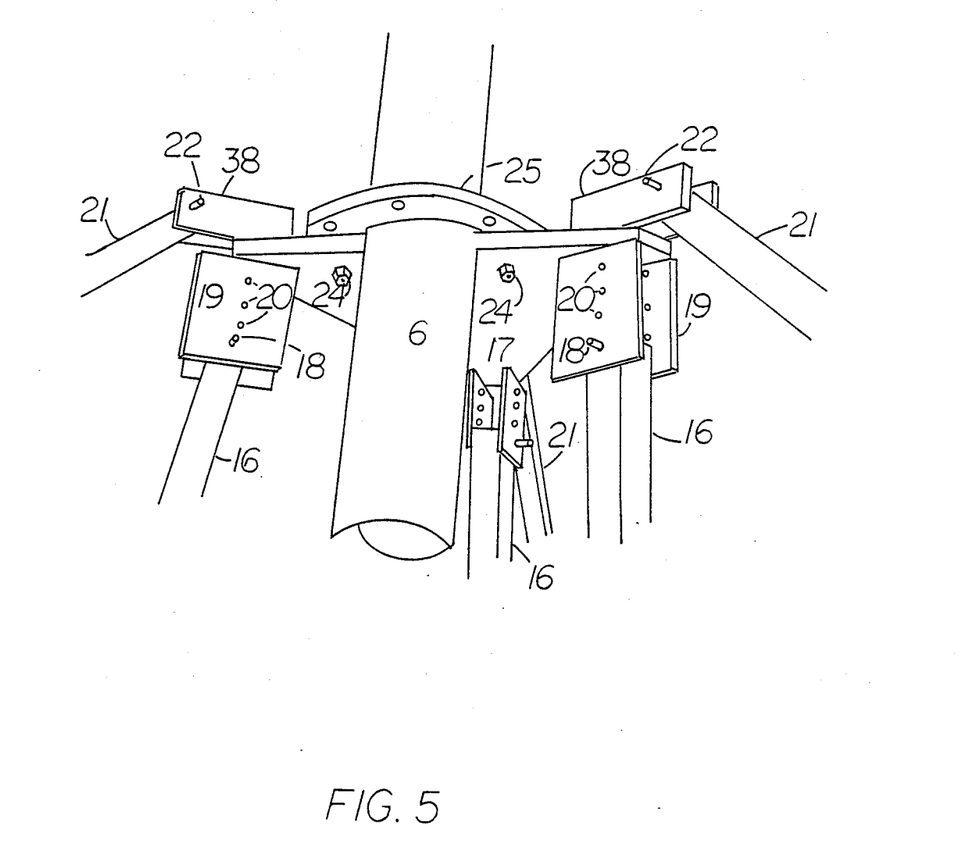
FIG. 5 is an enlarged view of the upper base plate on the ground-mounted system.

As best seen in FIG. 3, vertical support arms 16 extend vertically from the inner end of each base leg 11, being joined to both legs 11 and plate 9 using pins 13. As best seen on FIG. 5, the upper ends of vertical support arms 16 are connected to upper base plate 17 using pins 18 and adjustable mounting plates 19. After the base unit is assembled and the base legs 11 properly located, pins 18 are individually placed in holes 20 on mounting plates 19 to provide the best angle for riser pipe 6 for the specific terrain. If desired, similar adjustment means can be provided at the bottom of said vertical support arms on the lower base plate.

Extending vertically and at an angle inward toward upper base plate 17 are lateral support arms 21 which are flexibly connected to ground pads 35 and upper base plate 17 using hinge pins 22 and mounting plates 38. Again, this allows for ease of assembly and adjustment of the base to match the terrain.

Vertical riser pipe 6 is secured to upper base plate 17 using bolts 24 and circular clasp 25. If maximum spray elevation is needed, upper pipe section 26 can be connected to riser pipe 6 using flange and gasket assembly 27. To stabilize the riser pipe, guy wires 28 are used at the top of pipe sections 6 and 26.

All pins are easily removable for quick set-up and take-down.

Figure 7:
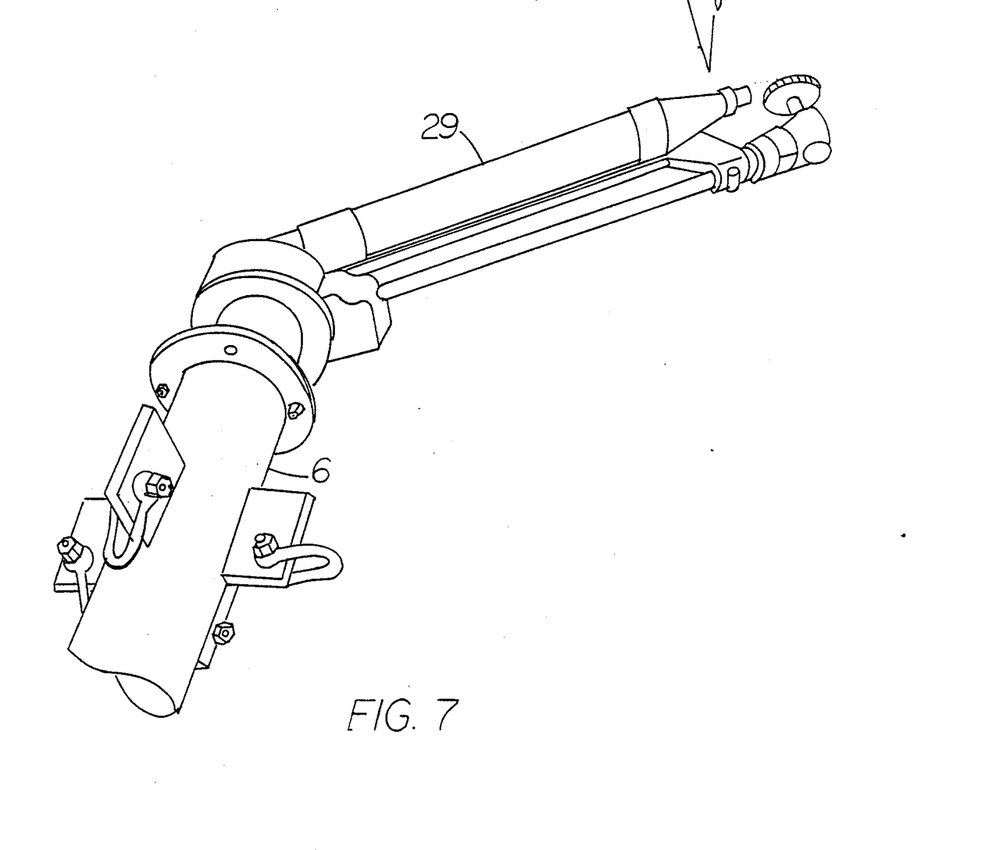
FIG. 7 is an enlarged view of the sweep sprinkler mounted at the top of the riser pipe.

Flange-bolted to the top of riser pipe 6 or 26 is nozzle 29. Nozzle 29 is preferably an irrigation-type sweep sprinkler with a water turbine driven gear mechanism to rotate the sprinkler during use. The size of the sprinkler nozzle should be selected and spray arc adjusted to correspond to the size and configuration of the bird roost to be treated. For example, the G.I.C. P-1200 model sweep sprinkler available from General Irrigation Company, Carthage, Mo., can provide a spray radius of 290 feet with a nozzle pressure of 110 psi.

Figure 8:
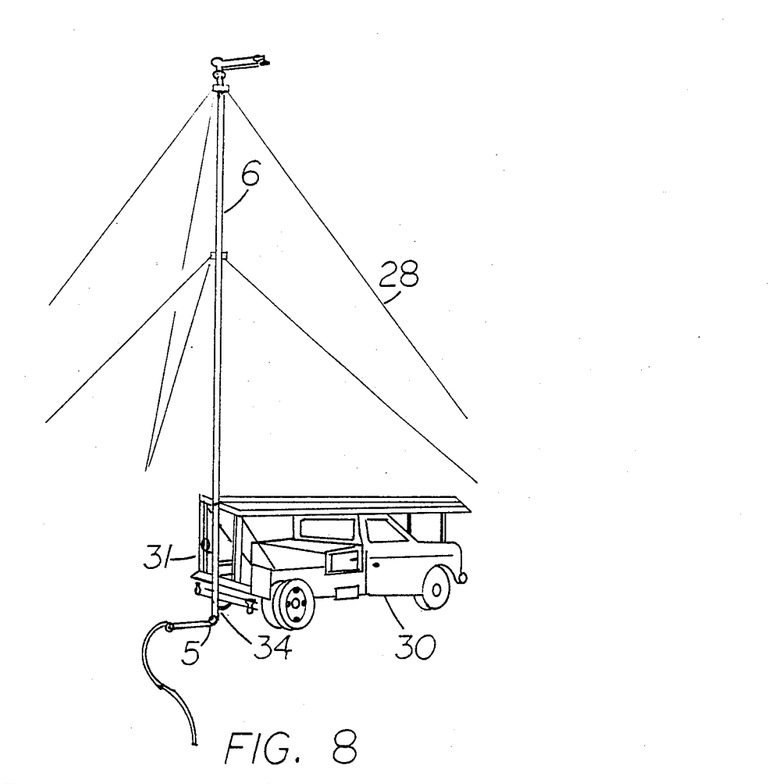
FIG. 8 is a perspective view of the truck-mounted system ready for use.
Figure 9:
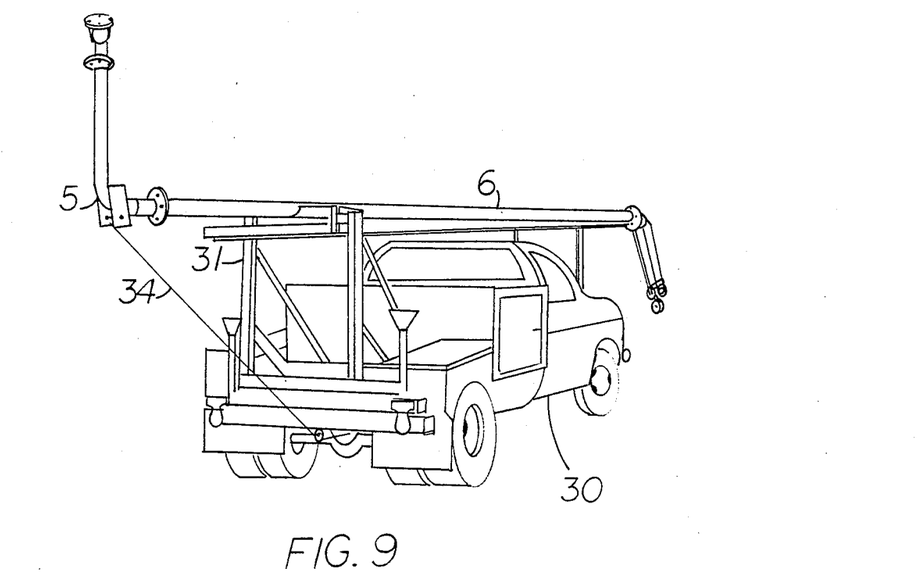
FIG. 9 is a perspective view of the truck-mounted system in the travelling position.

The truck-mounted system, as seen on FIGS. 8, 9 and 10 is similar except that its base support is provided by truck bed 30 and truck mounting frame 31. Riser mounting means 32 is attached to truck mounting frame 31 using hinge 33. Winch wire 34 connects to pipe elbow 5 and is used to raise and lower riser pipe 6. Once raised, riser pipe 6 is stabilized using guy wires 28.

What I claim is:

1. An improved method of chemical spray treatment of unwanted bird roosts using water, chemical wetting agents, pumping means, means for mixing water and chemical, and spray means, wherein the improvement comprises in combination:

a. connecting a pumping means to the spray location with flexible water hose and quick-connect hose fittings;

b. assembling a single stationary rigid vertical riser pipe to elevate the spray means;

c. erecting a portable vertical riser pipe support base assembly in or adjacent to the bird roost to be sprayed;

d. adjusting the portable vertical riser pipe support base assembly to match the corresponding ground terrain;

e. attaching the vertical riser pipe to its support base assembly with a hinge mount;

f. attaching a rotating spray means to the top of the vertical riser pipe and selecting the desired arc of rotation and spray radius, where said spray means is capable of operating at nozzle pressures in excess of 100 psi;

g. pulling the vertical riser pipe from horizontal to vertical using guy wires attached to the pipe and temporarily securing the pipe to the support base assembly;

h. securing the guy wires;

i. selecting the pumping pressure to correspond to the desired spray radius; and j. spraying the bird roost until the birds have been soaked with water and have received the appropriate amount of chemical wetting agent.

2. An improved method of chemical spray treatment of unwanted bird roosts using water, chemical wetting agents, pumping means, means for mixing water and chemical, and spray means, wherein the improvement comprises in combination:

a. connecting a pumping means to the spray location with flexible water hose and quick-connect hose fittings;

b. assembling a single stationary rigid vertical riser pipe to elevate the spray means;

c. attaching the vertical riser pipe to a truck bed adapted for hinge mounting said vertical riser pipe;

d. attaching a rotating spray means to the top of the vertical riser pipe and selecting the desired arc of rotation and spray radius, where said spray means is capable of operating at nozzle pressure in excess of 100 psi;

e. pulling the vertical riser pipe from horizontal to vertical using a cable attached to the base of the riser pipe;

f. securing the cable and guy wires;

g. selecting the pumping pressure to correspond to the desire spray radius; and h. spraying the bird roost until the birds have been soaked with water and have received the appropriate amount of chemical wetting agent.

3. An improved portable apparatus for chemical spraying of bird roosts in trees and vegetation, connected to a fluid pumping means, wherein the improvement comprises in combination:

a. a flexible fluid delivery hose placed between the pumping means and the location to be sprayed, said fluid delivery hose adapted for injection of and mixing of chemical with water;

b. a rigid vertical riser pipe erected at or near the location to be sprayed, said riser pipe comprising one or more connected sections of rigid pipe;

c. rotating spray means attached to the top of the rigid vertical riser pipe, where said rotating spray means is a water-powered sweep sprinkler capable of operating at nozzle pressures above 100 psi and having an adjustable spray arc;

d. quick-connect means for connecting the pumping means and rigid vertical riser pipe to the fluid delivery hose;

e. a portable riser base means comprising a centrally located lower base plate with hinged means for securing the base of the riser pipe at ground level; horizontal legs extending radially from said lower base plate and flexibly connected to said lower base plate; an upper base plate adapted for temporary attachment to the vertical riser pipe directly above said lower base plate; lateral support arms extending from said flexibly connected to the outer end of said horizontal legs and flexibly connected to said upper base plate; vertical support arms extending vertically from and flexibly connected to said lower base plate and flexibly connected to said upper base plate; and pin means for adjusting the vertical distance between said vertical upper base plate and said lower base plate at each point where said vertical support arm is connected to said upper base plate and said lower base plate.

* * * * *